US011351866B2

(12) United States Patent
Lopez De Arroyabe

(10) Patent No.: US 11,351,866 B2
(45) Date of Patent: Jun. 7, 2022

(54) BATTERY CONTROLLER FOR AN ELECTRICALLY DRIVEN VEHICLE WITHOUT ANY LOW-VOLTAGE BATTERY, ELECTRICALLY DRIVEN VEHICLE COMPRISING SAID CONTROLLER, AND METHOD

(71) Applicant: Bayerische Motoren Werke Aktiengesellschaft, Munich (DE)

(72) Inventor: Jose Lopez De Arroyabe, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/333,280

(22) Filed: Oct. 25, 2016

(65) Prior Publication Data

US 2017/0036545 A1    Feb. 9, 2017

Related U.S. Application Data

(63) Continuation of application No. PCT/EP2015/057467, filed on Apr. 7, 2015.

(30) Foreign Application Priority Data

Apr. 30, 2014    (DE) ............. 10 2014 208 117.3

(51) Int. Cl.
*B60L 1/00*    (2006.01)
*H01M 10/44*    (2006.01)
(Continued)

(52) U.S. Cl.
CPC .............. *B60L 1/00* (2013.01); *B60L 3/0046* (2013.01); *B60L 58/12* (2019.02); *B60L 58/18* (2019.02);
(Continued)

(58) Field of Classification Search
CPC ...... B60L 1/00; B60L 3/0046; B60L 11/1853; B60L 11/1868; B60L 58/18; B60L 58/12;
(Continued)

(56) References Cited

U.S. PATENT DOCUMENTS 3,343,073 A    9/1967    Lee
4,528,459 A  *  7/1985    Wiegel ................ H02J 9/061
                                                       307/66
(Continued)

FOREIGN PATENT DOCUMENTS

CN    102906963 A    1/2013
CN    103347742 A    10/2013
(Continued)

OTHER PUBLICATIONS

International Search Report (PCT/ISA/210) issued in PCT Application No. PCT/EP2015/057467 dated Jan. 4, 2016 with English translation (Four (4) pages).
(Continued)

*Primary Examiner* — Rexford N Barnie
*Assistant Examiner* — Swarna N Chowdhuri
(74) *Attorney, Agent, or Firm* — Crowell & Moring LLP

(57) ABSTRACT

A system for an at least partially electrically driven or hybrid vehicle includes an electronic devices that is configured to supply current to at least one of the further electrical loads on the vehicle, from a number of series-connected energy storage cells in the electrical energy storage which is smaller than the maximum number of series-connected energy storage cells in the energy storage, in the event that a maximum current for the at least one further electrical load exceeds the maximum current which can be delivered by the voltage converter. The vehicle has an electrical energy storage, which is provided for driving the vehicle and comprises energy storage cells connected in series, and a voltage
(Continued)

converter coupled to the energy storage for the supply of at least one further electrical load on the vehicle.

15 Claims, 5 Drawing Sheets

(51) Int. Cl.
  *H01M 10/46* (2006.01)
  *B60L 3/00* (2019.01)
  *B60L 58/20* (2019.01)
  *B60L 58/18* (2019.01)
  *B60L 58/12* (2019.01)
  *B60T 8/176* (2006.01)
  *H01M 10/0525* (2010.01)
  *H02J 7/00* (2006.01)

(52) U.S. Cl.
  CPC ............ *B60L 58/20* (2019.02); *B60T 8/176* (2013.01); *H01M 10/0525* (2013.01); *H01M 10/441* (2013.01); *H01M 10/46* (2013.01); *B60L 2210/14* (2013.01); *H01M 2220/20* (2013.01); *H02J 2007/0067* (2013.01); *H02J 2207/20* (2020.01); *Y02T 10/70* (2013.01)

(58) Field of Classification Search
  CPC ...... B60L 58/20; B60L 2210/14; B60T 8/176; H01M 10/441; H01M 10/46; H01M 2220/20
  USPC .......................................... 307/9.1
  See application file for complete search history.

(56) References Cited

U.S. PATENT DOCUMENTS

| | | |
|---|---|---|
| 6,583,602 B2 | 6/2003 | Imai et al. |
| 8,823,206 B2* | 9/2014 | Omoto ................. B60L 3/0046 307/9.1 |
| 2004/0130214 A1* | 7/2004 | Murty .................. H02J 7/1423 307/66 |
| 2012/0056478 A1* | 3/2012 | Omoto .................... B60L 58/10 307/11 |
| 2012/0089402 A1 | 4/2012 | Carder |
| 2013/0062940 A1 | 3/2013 | Winkler |
| 2013/0313898 A1 | 11/2013 | Proebstle et al. |
| 2014/0130214 A1 | 5/2014 | Solgaard et al. |
| 2015/0380776 A1* | 12/2015 | Partes .................... B60L 58/22 429/61 |

FOREIGN PATENT DOCUMENTS

| | | |
|---|---|---|
| DE | 10 2009 048 614 A1 | 7/2010 |
| DE | 10 2011 003 605 A1 | 8/2012 |
| DE | 10 2012 007 225 A1 | 11/2012 |

OTHER PUBLICATIONS

German-language Written Opinion (PCT/ISA/237) issued in PCT Application No. PCT/EP2015/057467 dated Jan. 4, 2016 (Six (6) pages).

German-language Search Report issued in counterpart German Application No. 10 2014 208 117.3 dated Jan. 20, 2015 with partial English translation (Ten (10) pages).

Chinese-language Office Action issued in counterpart Chinese Application No. 201580005432.4 dated Jun. 7, 2017 with English translation (19 pages).

\* cited by examiner

BATTERY CONTROLLER FOR AN ELECTRICALLY DRIVEN VEHICLE WITHOUT ANY LOW-VOLTAGE BATTERY, ELECTRICALLY DRIVEN VEHICLE COMPRISING SAID CONTROLLER, AND METHOD

CROSS REFERENCE TO RELATED APPLICATIONS

This application is a continuation of PCT International Application No. PCT/EP2015/057467, filed Apr. 7, 2015, which claims priority under 35 U.S.C. § 119 from German Patent Application No. 10 2014 208 117.3, filed Apr. 30, 2014, the entire disclosures of which are herein expressly incorporated by reference.

BACKGROUND AND SUMMARY OF THE INVENTION

The embodiments of the invention relate to a system including a control device for an electrically driven vehicle, an electrically driven vehicle having a control device and a method for the control of electrically driven vehicles.

Electrically driven vehicles, such as electric vehicles or hybrid vehicles, are customarily propelled by a first battery, or high-voltage battery, which delivers the voltage e.g. of 300 V, and which naturally delivers the current for the propulsion of the electric vehicle. The first battery has a plurality of series-connected battery cells. A further battery, also referred to as the starter battery or stand-by battery, is also provided, which can deliver a lower voltage, e.g. of 12 V, independently of the first battery, at least temporarily, for the control and monitoring of the customary control devices, such as the anti-lock braking system (ABS), a bodywork control device, the various vehicle functions such as the electric window openers, headlights and rear lights, but also tyre pressure or keyless entry control (in short: body controller), indicator lights, etc. A DC/DC converter is also provided, which can also supply the control devices, and is also used for the charging of the starter battery. The DC/DC converter is supplied by the high-voltage battery. The DC/DC converter can only deliver the average power requirement of the control devices. Specifically the ABS system, for example during emergency braking, requires very high currents of up to 100 A. In order to accommodate these current peaks, the starter battery is also employed. However, the use of two batteries is expensive and complex. The design of the DC/DC converter for higher currents is also excessively cost-intensive.

One object of the disclosed control device is to provide an improved system for the electronic control or regulation of the current or voltage supply of an at least partially electrically driven vehicle, an at least partially electrically driven vehicle with an improved system for control or regulation and improved methods for the control or regulation of the current or voltage supply of electrically driven vehicles, which eliminate the disadvantages of control or regulation systems.

According to one aspect of the disclosed control device, an electronic device for an at least partially electrically driven vehicle is disclosed accordingly.

The vehicle may be an electric or hybrid vehicle. The vehicle has an electrical energy store (also known as a battery or accumulator), which is provided for driving the vehicle. The energy store comprises energy storage cells connected in series. The vehicle is also provided with a voltage converter (e.g. a DC/DC converter) coupled to the energy store for the supply of further electrical loads on the vehicle. The voltage converter is supplied by the energy store.

The electronic device is advantageously configured to supply current (also referred to as stand-by or booster current) to at least one of the further electrical loads on the vehicle, from a number of series-connected energy storage cells in the electrical energy store which is smaller than the maximum number of series-connected energy storage cells in the energy store, in the event that a maximum current rating (maximum current) for the at least one further electrical load exceeds the maximum current which can be delivered by the voltage converter. The terms "maximum current rating" or "maximum current" refer here to both the magnitude and the duration of the current. By this arrangement, a stand-by or starter battery can be entirely omitted.

On the input side, the voltage converter is coupled to the output node point of the energy store which delivers the, for example the maximum, voltage, but at least a higher voltage than that provided by the number of series-connected energy storage cells for the delivery of the stand-by current. The current or voltage supply by means of the electronic device thus bypasses the voltage converter. Accordingly, the voltage converter is not required to deliver excessively high peak currents or maximum currents.

The energy store comprises a plurality of series-connected energy storage cells. By series connection, the voltages of the energy storage cells are combined.

The electronic device can also comprise the energy store and/or the voltage converter.

The electronic device can also be configured to deliver the maximum current (maximum current, peak current or short-term current), in response to a state of charge or discharge of the energy store, from a different number of series-connected energy storage cells. Accordingly, different states of charge of the energy store, or of the energy storage cells of the energy store, can be accommodated. Thus, if the voltage converter is not able to deliver sufficient current for the maintenance of the voltage on a supply node point for the further electrical loads or, in other words, if the current required by the loads is too high, the voltage on the supply node point is reduced, and the supply of electric power to the loads is effected directly and, where applicable, additionally from the corresponding energy storage cells of the energy store.

The electronic device can also be configured to deliver the maximum current, in response to the state of charge or discharge of the energy store, from a first number and a second number of series-connected energy storage cells, wherein the first number is different from the second number. In principle, therefore, different numbers of series-connected energy storage cells can be employed, according to the requisite minimum and maximum voltage levels for the further electrical loads on the vehicle.

The first number of energy storage cells can differ from the second number of energy storage cells by one energy storage cell. The number of storage cells is generally dependent upon the type of energy store or the type of energy storage cells. Where lithium-ion cells are used, the difference of one storage cell delivers a favorable voltage range. For example, the first number can be 3 and the second number can be 4.

The electronic device can be configured to switch over the voltage or current supply of the at least one further electrical load from the first number of series-connected energy storage cells to the second (larger) number of series-connected energy storage cells, if a voltage across the first number of series-connected energy storage cells has achieved or falls below a lower limiting value. Moreover, the device can be designed to switch over the voltage or current supply of the at least one further electrical load from the second number of series-connected energy storage cells to the first and smaller number of series-connected energy storage cells, if a voltage across the second number of series-connected energy storage cells has achieved or exceeds an upper limiting value. This makes it possible to maintain the supply voltage within a permissible range.

The upper limiting value can at least in a significant proportion be defined by a nominal output voltage of the voltage converter. If the output voltage of the electronic device at the supply node point of the loads becomes greater than the nominal regulated output voltage value of the voltage converter (for example a DC/DC converter), a switchover to a lower number of series-connected energy storage cells can thus be executed. The lower limiting value can be defined, for example, by a lower limiting value for the requisite supply voltage of the at least one electrical load.

The electronic device can comprise a switch, a first and a second diode, and a control unit. Accordingly, the electronic device can be constructed in an exceptionally cost-effective and simple manner such that, even in this simple form, it renders the significantly more expensive stand-by battery or starter battery superfluous. Although the term "control unit" is applied here, this control unit specifically comprises regulating functions in addition, as this unit generates output signals in response to input signals. Accordingly, the term "regulating unit" can also be applied in place of the term "control unit".

A first diode can be coupled between a first output node point of the energy store and a supply node point. The first output node point has a first voltage, which corresponds to the sum of the individual voltages of the first number of series-connected energy storage cells. The supply node point can be coupled to the further or the at least one further load to be supplied. The first diode is coupled in the direction of flow from the first output node point to the supply node point. In other words, the anode of the first diode is coupled to the first output node point, and the cathode of the first diode is coupled to the supply node point. The second diode can be coupled between a second output node point of the energy store and the supply node point, wherein the second output node point has a second voltage, which corresponds to the sum of the individual voltages of the second number of series-connected energy storage cells. The second diode is thus coupled in the direction of flow from the second output node point to the supply node point or, in other words, the anode of the second diode is coupled to the second output node point, and the cathode of the second diode is coupled to the supply node point. The at least one switch is coupled between the second diode and the second output node point.

The control unit can generally be designed for the opening (breaking) or closing (making conductive) of at least one electrical conduction path through one of the diodes in response to a state of charge or discharge of the energy store. For example, the control circuit can then be designed such that the switch is closed if and for such time as the second output voltage becomes or is smaller than the supply voltage, and is opened (disconnected or interrupted) if and for such time as the second output voltage becomes or is greater than the supply voltage.

The first output voltage can then remain continuously coupled to the supply node point via one of the diodes. Here again, the limited complexity and the effectiveness of the circuit are discernible.

The control circuit can be configured as a comparator circuit (comparator), the first (non-inverting, positive) input of which can be coupled to the second output node point, and the second (inverting, negative) input of which can be coupled to the supply node point. The output of the comparator circuit can be functionally coupled to the switch, in order to effect the opening or closing of the switch in response to a voltage difference between the first input and the second input. The overall result is thus a circuit which is of limited complexity, but which is highly effective for the system as a whole.

The energy storage cells can also be designated as battery cells or accumulator cells. Advantageously, the energy storage cells are lithium-ion cells. The voltage of the lithium-ion cells lies between 2.8 V and 4.15 V, from which the above-described advantageous aspects and configurations can proceed.

The energy store can be designed for a rated voltage of 60 V. This is the output voltage which is dictated by the maximum number of series-connected energy storage cells. This maximum or rated output voltage is used for the electric drive system of the vehicle. Moreover, a voltage in the region of 60 V (conversely to the also customary 300 V) permits the option of the galvanic coupling of the ground potentials of the energy store and the further electrical loads. This too simplifies construction.

Disclosed herein is also an electric vehicle or hybrid vehicle, specifically a two-wheeled electric vehicle or electrically powered motorcycle, which comprises an electronic device in accordance with one or more of the aspects and configurations disclosed in the present description. Specifically, the electric vehicle also incorporates the energy store.

Disclosed herein is also a method for the regulation of the supply of electrical loads in an at least partially electrically driven vehicle, specifically an electric or hybrid vehicle. As described above, the vehicle has an electrical energy store, which is provided for driving the vehicle and comprises energy storage cells connected in series. Moreover, a voltage converter, coupled to the energy store, is provided for the supply of further electrical loads on the vehicle. According to the method, at least one of the further electrical loads on the vehicle is selectively supplied with current from a number of energy storage cells in the electrical energy store which is smaller than the maximum number of series-connected energy storage cells of the energy store. This occurs in the event that a maximum current for the at least one further electrical load exceeds the maximum current which can be delivered by the voltage converter which is coupled to the energy store.

Other objects, advantages and novel features of the embodiments of the present invention will become apparent from the following detailed description of one or more preferred embodiments when considered in conjunction with the accompanying drawings, in which:

DETAILED DESCRIPTION OF THE DRAWINGS

Figure 1:
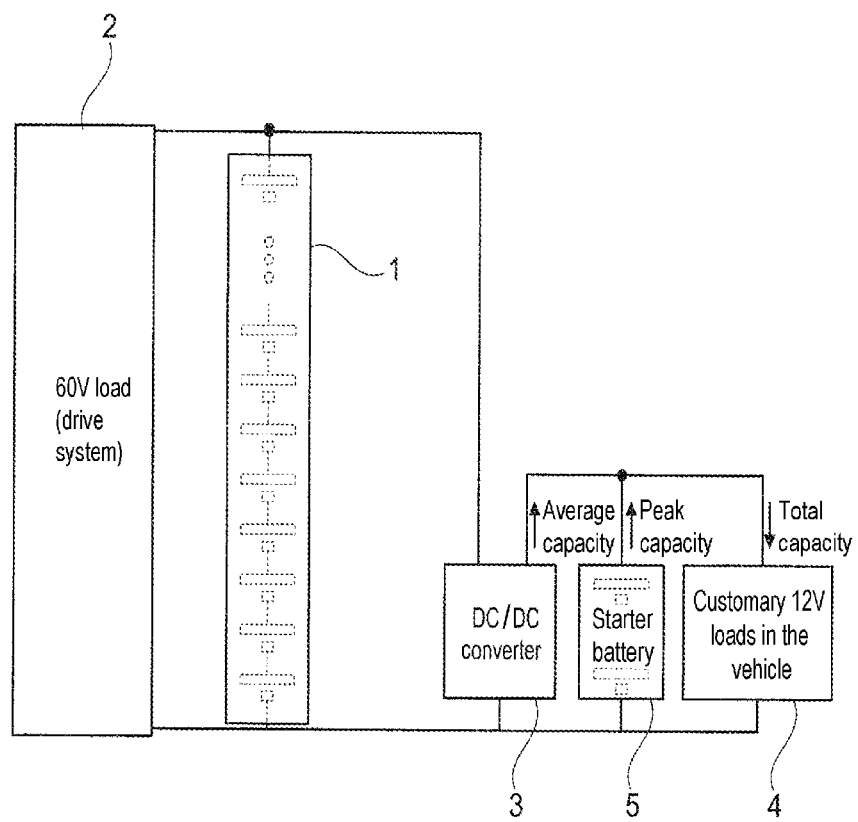
FIG. 1 is a simplified schematic block diagram of an existing system.

FIG. 1 shows a simplified schematic block diagram of a system according to the prior art. The figure shows an energy store 1, a load 2 (the drive system of an electrically driven vehicle), and a voltage converter or DC/DC converter 3, which is coupled to the energy store 1 and which assumes the supply of the further electrical loads 4 on the vehicle. A starter battery 5 is also represented, which delivers the peak currents for the loads 4, if these currents can no longer be supplied by the DC/DC converter.

Figure 2:
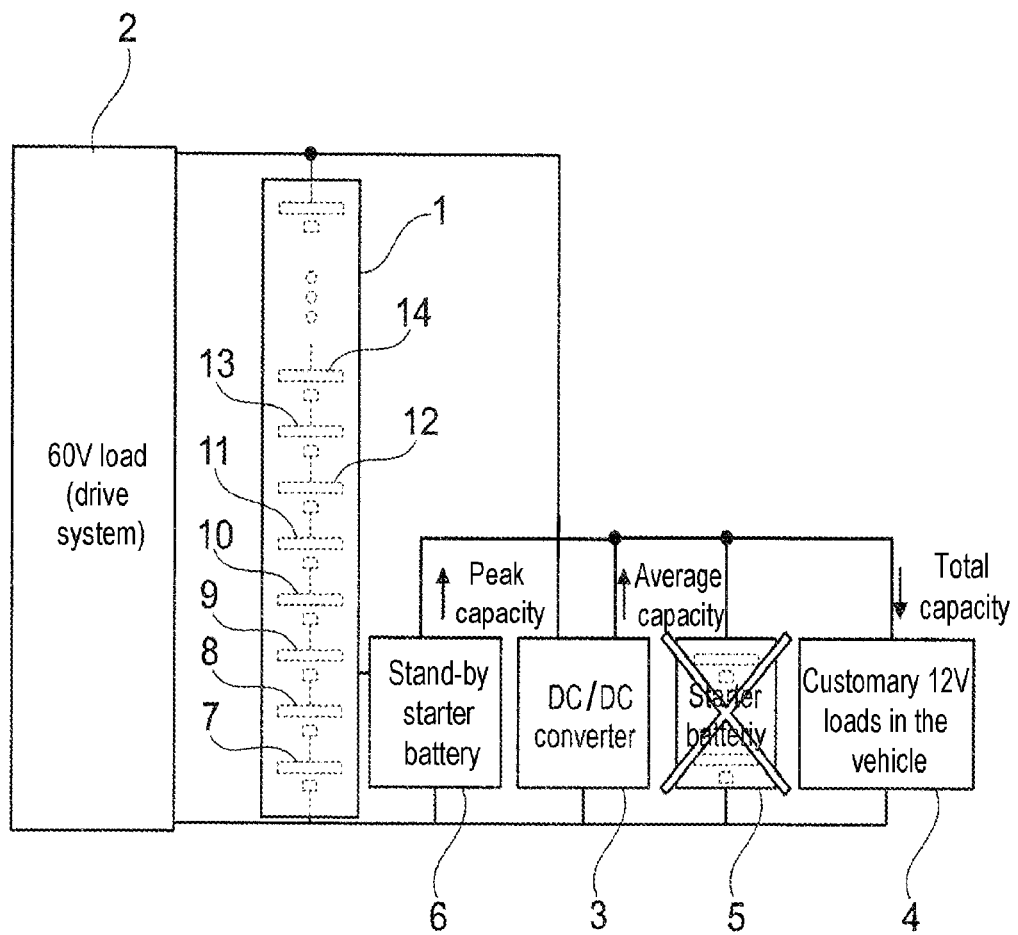
FIG. 2 is a simplified schematic block diagram of an inventive system.

FIG. 2 shows a simplified schematic representation of an inventive system. Here again, an energy store 1, a load or drive system 2 (the drive system of an electrically driven vehicle) and a voltage converter or DC/DC converter 3 are provided, wherein the latter is coupled to the energy store 1 and assumes the supply of the further electrical loads 4 on the vehicle. The starter battery 5 is now no longer required. In its place, the supply of stand-by or booster current and the supply of voltage is assumed by the electronic device 6. The electronic device 6 now delivers the requisite peak currents for the loads 4, where these currents can no longer be delivered by the DC/DC converter 3. The electronic device 6 is coupled to a number of energy storage cells (some of which are represented here, with the reference numbers 7-14), which are arranged in series.

A situation in which peak currents are required can occur, for example, in the event of emergency braking. In this case, the at least one electrical load is then, for example, an anti-lock braking system (ABS), which can require short-term currents of up to 100 A. The voltage converter 3 is not designed for this purpose. Consequently, according to the invention, a supply is provided directly from the energy storage cells 7-14 etc. of the energy store 1 for this purpose.

The electronic device 6 is configured to supply electric power or electric current to at least one of the further electrical loads 4 on the vehicle from a number of series-connected energy storage cells (for example, 7, 8 and 9 from 7 to 14, etc.) of the electrical energy store 1 which is smaller than the maximum number of series-connected energy storage cells of the energy store 1, in the event that a maximum current rating (maximum current) of the at least one further electrical load 4 exceeds the maximum current available from the voltage converter (the DC/DC converter 3).

Figure 3:
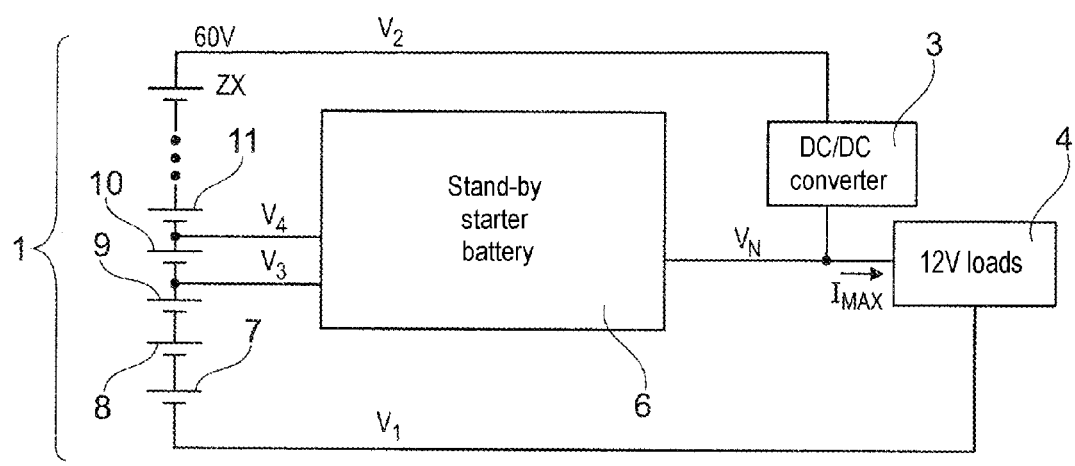
FIG. 3 is a simplified schematic representation of the inventive system.

FIG. 3 shows a simplified schematic representation of the electronic device 6 or the coupling thereof to the energy store 1. According to this representation, the electronic device or also circuit 6 is coupled to the node point V3 on the input side. On this node point there is a voltage, which is delivered by the series circuit of the three energy storage cells 7, 8 and 9. The voltage on V3 is therefore the sum of the voltages of the three energy storage cells 7, 8 and 9. The device 6 is also coupled on the input side to the node point V4. The latter carries the sum of the voltages of the energy storage cells 7, 8, 9 and 10. Accordingly, on the electronic device, there are two partial voltages V3 and V4, which correspond to the sum of the voltages of three energy storage cells or four energy storage cells respectively. The output of the electronic device 6 is coupled to a supply node point VN. The output from the DC/DC converter 3 is also coupled to this supply node point VN. Furthermore, the electrical loads 4 are supplied by this supply node point VN. The energy store 1 and the loads 4 have a common ground potential V1. The maximum output voltage associated with the maximum number of series-connected energy storage cells 7, 8, 9, 10, 11 . . . ZX is present on the node point V2. This voltage is the rated voltage of 60 V. The DC/DC converter is coupled on the input side to this node point V2. If the DC/DC converter is not able to deliver a requisite current IMAX for the loads 4, this current is delivered—at least partially—by the electronic device 6, which draws its voltage and the requisite current from the series-connected energy storage cells 7 to 10. The number of energy storage cells 7 to 10 is smaller than the maximum number of series-connected energy storage cells 7 to ZX of the energy store 1. As a result, the voltages (partial voltages) V3 and V4 are naturally also smaller than the voltage on the node point V2.

Figure 4:
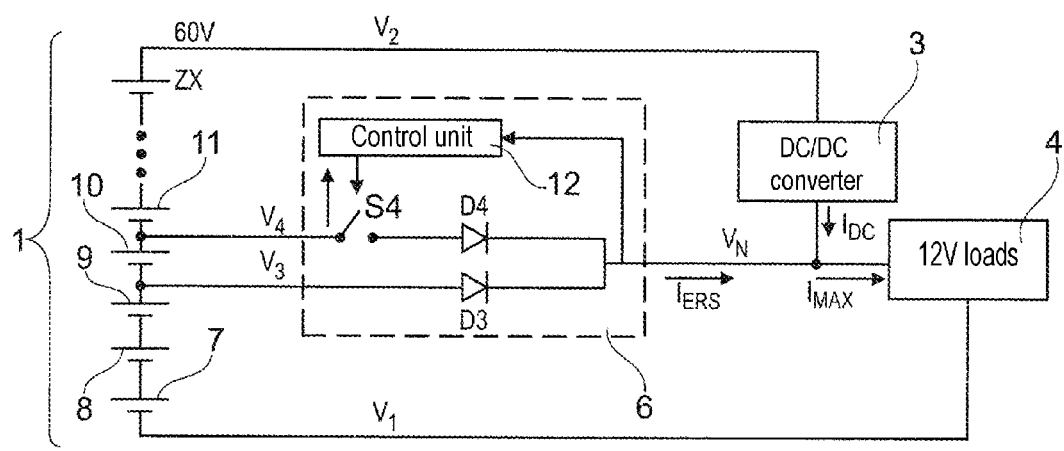
FIG. 4 is a simplified schematic representation of an inventive circuit.

FIG. 4 shows a simplified schematic circuit diagram. The electronic device 6 comprises a switch S4, a first diode D3 and a second diode D4 and a control unit 12. Although the term "control unit" is applied here, this unit specifically performs regulating functions, as also disclosed in the following description. The first diode D3 is coupled between the first output node point V3 of the energy store 1 and the supply node point VN. The first output node point V3 has a first voltage, which corresponds to the sum of the individual voltages of the first number (in this case 3) of series-connected energy storage cells 7, 8, 9. The supply node point VN is coupled to the further loads 4 to be supplied, or the loads 4 are connected to this node point VN. The first diode D3 is coupled in the direction of flow from the first output node point V3 to the supply node point VN. The anode of the first diode D3 is coupled to the first output node point V3, and the cathode of the first diode D3 is coupled to the supply node point VN. The second diode D4 is coupled between the second output node point V4 of the energy store 1 and the supply node point VN. The second output node point has a second voltage V4, which corresponds to the sum of the individual voltages of the second number (in this case 4) of series-connected energy storage cells 7 to 10. The second diode D4 is thus coupled in the direction of flow from the second output node point to the supply node point VN. In other words, the anode of the second diode D4 is coupled to the second output node point V4, and the cathode of the second diode D4 is coupled to the supply node point VN. The switch S4 is arranged between the anode of the second diode D4 and the second output node point V4. In this connection, it is also clear that "coupling", within the meaning of the present description, does not preclude the presence of further components between two coupled components. The control unit 12 is coupled on the input side at least with the supply node point VN. Preferably, a further input of the control unit 12 is coupled to the second output node point V4. The control unit 12 is also designed for the changeover of the switch S4 between a closed (conducting) and an opened (non-conducting) position. To this end, an output of the control circuit 12 is coupled to the switch S4. The control circuit 12 is generally designed for the opening (breaking) or closing (making conductive) of at least one electrical conduction path through one of the diodes D3, D4 in response to a state of charge or discharge of the energy store 1. In the present case, this path is the current path through the second diode D4. Naturally, other configurations, specifically with a plurality of switches, would also be conceivable.

As in FIG. 3, the maximum voltage on the energy store 1 lies, as a result of the maximum number of series-connected energy storage cells 7 to ZX, on the node point V2 and, is 60 V. The common ground potential of the energy store 1 and the loads 4 is V1.

If the current IDC on the output of the DC/DC converter 3 is not sufficient to supply the loads 4 (IMAX), at least the difference is delivered by the device 6 in the form of the stand-by or booster current IERS (IERS=IMAX−IDC). If the voltage on the first output node point V3 is not sufficient, that is if the voltage V3, as a result of the state of charge of the energy store 1 and its energy storage cells 7 to 9, is too low, the control circuit 12 switches the switch S4 to the conducting state. A connection is thus formed between the second output node point V4 and the supply node point VN via the diode D4, and the voltage on the supply node point VN can be increased accordingly.

In normal operation, the voltage converter 3 delivers the supply voltage to the supply node point. This voltage may be e.g. 14 V. In normal operation, the voltage converter 3 can deliver sufficient current for the supply of all the loads 4. The switch S4 is disconnected (opened), and the voltage on the node point V3 is, for example, 11 V. In this configuration, no current flows through D3, as the voltage on the anode (V3=11 V) is lower than on the cathode (VN=14 V). If the current consumption of the loads 4 rises above the maximum current which can be delivered by the voltage converter, for example in the event of full ABS braking, the voltage converter 3 cannot supply this current. The voltage on the node point VN then dips (decays). If this voltage dip is sufficiently large, for example if the voltage VN dips from 14 V to 10 V, the diode D3 becomes conductive, as there is now a higher voltage on the anode (11 V) than on the cathode (10 V). Accordingly, additional current flows from the node point V3 (i.e. from the energy storage cells 7, 8 and 9), thereby preventing any further decay in the voltage on VN. As a precondition, the loads must maintain their regular operation at a voltage which lies below the voltage of the voltage converter (in this case 14 V). Here, it might for example be assumed that the loads 4 can operate at a voltage down to a lower limit of, for example, 9 V. Overall, this also means that the voltage on the anodes of the diode D3 is always smaller than the regular supply voltage of 14 V delivered by the voltage converter 3. Accordingly, the circuit delivers a very rapid support function, if a voltage dip occurs on the node point VN. As the voltage on V3 (i.e. delivered via the series connection of the energy storage cells 7, 8 and 9) is always smaller than the regular output voltage of the voltage converter in normal operation, the continuous flow of a current from the energy storage cells 7, 8, 9 to the loads 4 is also prevented. The selected energy storage cells (in the present example, consequently, the lower 3 or 4 cells) are only to be brought on-load in the event of an emergency, since the asymmetrical loading of the energy store would otherwise result.

Only if the voltage V3 becomes too low, e.g. 8 V, and thus falls below the lower limiting value for the requisite service voltage of the loads 4 (in this case, therefore, 9 V), is the switch S4 closed. The voltage is thus increased, in this case for example by one energy storage cell voltage (cell 10), such that the voltage on VN is restored to a value in excess of the minimum service voltage. The voltage V4-VD is present on the supply node point VN. This voltage is higher than the voltage delivered by V3, as the number of series-connected energy supply cells for V4 is greater than the number of series-connected cells for V3. The diode D3 prevents any backflow of current into the energy store 1 here. Alternatively, the current path through D3 might also be interrupted by a further switch. Naturally, the diode D4 also prevents the backflow of current where the switch S4 is closed and the voltage on the supply node point VN, for example by the action of the DC/DC converter, should become greater than the voltage V4.

Figure 5:
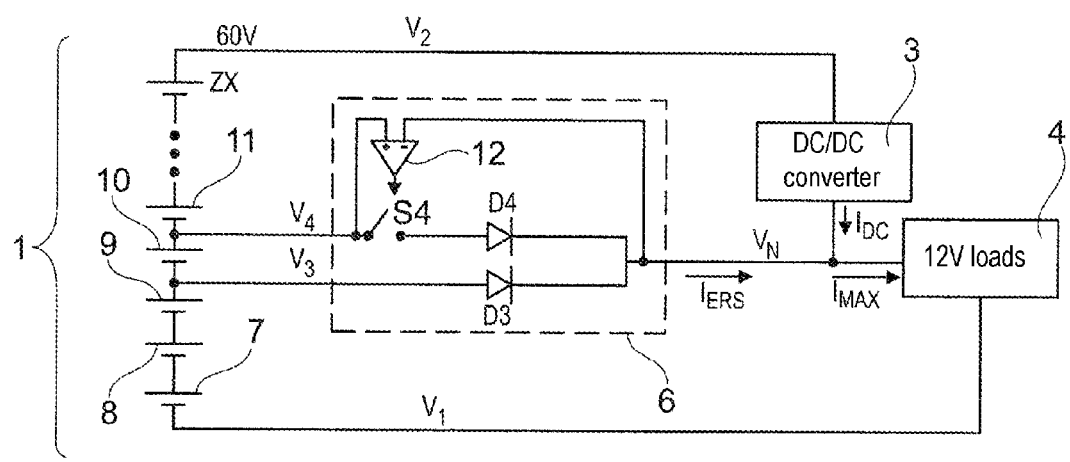
FIG. 5 is a simplified schematic representation of the inventive circuit.

FIG. 5 essentially shows the control circuit 12 is configured as a comparator circuit or comparator. The first (non-inverting, positive) input of the comparator 12 is coupled to the second output node point V4, and the second (inverting, negative) input of the comparator is coupled to the supply node point VN. The output of the comparator 12 is functionally coupled to the switch S4, in order to effect the closing or opening of the switch S4 in response to a voltage difference V4-VN between the first input and the second input of the comparator.

Accordingly, the control circuit 12 can be advantageously configured such that the switch S4 is closed (conducting) if and for such time as the voltage V4 becomes/is smaller than VN, and is opened (thus non-conducting) if and for such time as the voltage V4 becomes/is greater than VN.

The energy storage cells might be Li-ion cells (lithium-ion cells), each of which has a voltage between 2.8 V (discharged) and 4.15 V (fully charged). The first output voltage V3 is delivered by the three energy storage cells 7 to 9, and accordingly might lie between 8.4 V and 12.45 V (corresponding to the sum of the three individual voltages at the maximum and minimum value for the cells in the discharged and the charged state). The second output voltage V4 accordingly lies between 11.2 V and 16.6 V. The DC/DC converter might be independently set to deliver an output voltage of 14 V on the node point VN. If the on-board system voltage (supply voltage) on the node point VN is to be no lower than 9 V (lower limiting value) and no greater than 16 V, the following situation will arise:

If the output voltage V3 were to be applied with the energy storage cells 7, 8 and 9 in the discharged state, and at a diode forward voltage VD=0.7 V, a voltage VN=V3−VD=8.4 V−0.7 V=7.7 V would be present on the supply node point. This value would be too low, and would fall below the lower limiting value UG=9 V. The switch in this case (i.e. if the voltage V3 falls below 9.7 V) the switch S4 must therefore be closed, such that the voltage VN is now dictated by the second output voltage V4. In the worst case, the supply voltage would then be VN=V4−VD=11.2 V−0.7 V=10.5 V, and thus exceed the lower limiting value UG=9 V (i.e. lie within the permissible range).

If the energy store 1 is fully charged, the output voltage V4 would be 16.6 V, and the voltage on the supply node point VN=V4−VD=15.9 V, and thus theoretically still within the permissible range for the on-board system voltage. However, the voltage on VN would thus exceed the 14 V output voltage of the DC/DC converter. Accordingly, where a second output voltage V4 is greater than the regulated output voltage of the DC/DC converter plus the diode forward voltage VD (in this example, 14.7 V), the switch S4 should be re-opened such that, in the event of an emergency, the first output voltage V3 can dictate the voltage VN via the diode D3. In the present case, this value would be 12.45 V−0.7 V=11.75 V. These considerations give for the upper limiting value OG of the voltage for V4, OG=VDC+VD, i.e. the upper limiting voltage value is defined by the sum of the regulated output voltage VDC of the DC/DC converter plus the diode forward voltage VD.

Separate monitoring of the voltage on the node point V3 might be executed, but is not absolutely necessary here. In the present case, no separate monitoring of the voltage V3 is required. The switch S4 is closed if V4 lies below VN, regardless of the voltage level on V3. Consequently, where V4>VN, and VN is set at the normal service voltage by the voltage converter 3 (in this case, for example, 14 V), the following will apply: V3=V4−1× the cell voltage, such that the voltage on V3 is automatically smaller by one energy storage cell voltage than V4, and consequently exceeds the lower limiting value for the service voltage, such that the minimum service voltage of 9 V is then achieved or exceeded by V3. Consequently, no additional monitoring of the voltage on V3 is required here for the control of the switch S4. However, the monitoring of V3 and a corresponding additional control of the switch S4 would be possible.

Thus, in accordance with the aspects and exemplary embodiments, it is possible to execute the selective supply of current (also stand-by or booster current) to at least one of the further electrical loads on the vehicle from a number of energy storage cells in the electrical energy store which is smaller than the maximum number of series-connected energy storage cells in the energy store, specifically in the event that a maximum current for the further electrical loads exceeds the maximum current which can be delivered by a voltage converter which is coupled to the energy store. Accordingly, if the voltage converter is not capable of delivering sufficient current to maintain the voltage on the supply node point or, in other words, if the current required by the loads becomes too great, the voltage on the supply node point is necessarily reduced until the supply is directly assumed by the corresponding energy storage cells.

The electronic devices and method described above can be advantageously employed in electric vehicles or hybrid vehicles, specifically in two-wheeled electric vehicles or electrically powered motorcycles.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for an at least partially electrically driven or hybrid vehicle comprising:
    an electrical energy storage having a plurality of series connected energy storage cells, the electrical energy storage being configured to drive the vehicle;
    a voltage converter coupled to the electrical energy storage and being configured to supply of electrical loads on the vehicle;
    an electronic device that is configured to supply current to the electrical loads on the vehicle, from a number of series-connected energy storage cells in the electrical energy storage which is smaller than a maximum number of series-connected energy storage cells in the electrical energy storage,
    when a maximum current for the electrical loads exceeds a maximum current which is deliverable by the voltage converter, wherein the system is configured to i) provide the maximum current in response to the charge or discharge state of the electrical energy storage from a first number and a second number of energy storage cells connected in series, the first number being different from the second number and the first and the second number respectively being smaller than the maximum number of energy storage cells connected in series of the electrical energy storage, ii) transfer the voltage or power supply of the at least one further electrical consumer from the first number of energy storage cells connected in series to the second, and to switch of energy storage cells connected in series has reached or falls below a lower limit value, and iii) supply the voltage or power supply to the at least one further electrical consumer to switch from the second number of energy storage cells connected in series to the first smaller number of energy storage cells connected in series, if a voltage above the second number of the energy storage cells connected in series as reached or exceeded an upper limit value wherein
    the upper limit value is defined by a nominal output voltage of the voltage converter.

2. The system as claimed in claim 1, wherein the first number of energy storage cells differs from the second number of energy storage cells by one energy storage cell.

3. The system as claimed in claim 2, wherein the first number is 3 and the second number is 4.

4. The system as claimed in, wherein the electronic device comprises a switch, a first and a second diode, and a control unit.

5. The system as claimed in claim 4, wherein a first diode is coupled between a first output node point of the electrical energy storage and a supply node point, wherein the first output node point has a first voltage, which corresponds to the sum of the individual voltages of the first number of series-connected energy storage cells, and the supply node point is coupled to the further loads to be supplied, the first diode in the direction of flow from first output node point and supply node point, anode first diode to first output node point, cathode first diode to supply node point.

6. The system as claimed in claim 5, wherein the second diode is coupled between a second output node point of the electrical energy storage and the supply node point, wherein the second output node point has a second voltage, which corresponds to the sum of the individual voltages of the second number of series-connected energy storage cells.

7. The system as claimed in claim 6, wherein the at least one switch is coupled between the second diode and the second output node point.

8. The system as claimed in claim 7, wherein the control unit is designed for the opening or closing of at least one electrical conduction path through one of the diodes in response to a state of charge or discharge of the electrical energy storage.

9. The system as claimed in claim 8, wherein the control circuit is configured as a comparator circuit, the first non-inverting, positive input of which is coupled to the second output node point, and the second input of which is coupled to the supply node point, and the output of which is functionally coupled to the switch, in order to effect the opening or closing of the switch in response to a voltage difference between the first input and the second input.

10. The system as claimed in claim 9, wherein the control circuit is designed such that the switch is closed if and for such time as the second output voltage becomes or is smaller than the supply voltage, and is opened if and for such time as the second output voltage becomes or is greater than the supply voltage.

11. The system as claimed in claim 10, wherein the energy storage cells are lithium-ion cells.

12. The system as claimed in claim 11, wherein the electrical energy storage is designed for a maximum rated voltage of 60 V.

13. An electric vehicle or hybrid vehicle, specifically a two-wheeled electric vehicle or an electrically powered motorcycle, comprising the system as claimed in claim 12.

14. A method for the regulation of the supply of electrical loads in an at least partially electrically driven vehicle, specifically an electric or hybrid vehicle, having an electrical energy storage, which is provided for driving the vehicle and comprises energy storage cells connected in series, and a voltage converter coupled to the electrical energy storage for the supply of electrical loads on the vehicle, the system comprising: supplying using an electronic device, current to the electrical loads on the vehicle, from a number of series-connected energy storage cells in the electrical energy storage which is smaller than a maximum number of series-connected energy storage cells in the electrical energy storage, when a maximum current for the electrical loads exceeds a maximum current which is deliverable by the voltage converter;

providing the maximum current in response to the charge or discharge state of the electrical energy storage from a first number and a second number of energy storage cells connected in series, the first number being different from the second number and the first and the second number respectively being smaller than the maximum number of energy storage cells connected in series of the electrical energy storage;

transferring the voltage or power supply of the at least one further electrical consumer from the first number of energy storage cells connected in series to the second, and to switch a larger number of energy storage cells connected in series if a voltage above the first number of energy storage cells connected in series has reached or falls below a lower limit value; and supplying the voltage or power supply to the at least one further electrical consumer to switch from the second number of energy storage cells connected in series to the first, smaller number of storage cells connected in series, if a voltage above the second number of energy storage cells connected in series has reached or exceeded an upper limit value, wherein, the upper limit value is defined by a nominal output voltage of the voltage.

15. The system as claimed in claim 1, wherein when the supply current is not sufficient to supply the electrical loads, the electronic device is also configured to deliver a current difference in the form of a stand-by current.

\* \* \* \* \*